US00RE34664E

United States Patent [19]

Roggero Sein

[11] E Patent Number: Re. 34,664

[45] Reissued Date of Patent: Jul. 19, 1994

[54] METHOD AND APPARATUS FOR ELECTROLYTIC REFINING OF COPPER AND PRODUCTION OF COPPER WIRES FOR ELECTRICAL PURPOSES

[75] Inventor: Carlos E. Roggero Sein, Lima, Peru

[73] Assignee: ASARCO Incorporated, New York, N.Y.

[21] Appl. No.: 812,453

[22] Filed: Dec. 23, 1991

Related U.S. Patent Documents

Reissue of:

[64] Patent No.: 4,891,105
Issued: Jan. 2, 1990
Appl. No.: 107,218
Filed: Oct. 13, 1987

U.S. Applications:

[63] Continuation-in-part of Ser. No. 7,764, Jan. 28, 1987, abandoned.

[51] Int. Cl.[5] ..... C25D 7/06
[52] U.S. Cl. ..... 205/138; 204/206
[58] Field of Search ..... 205/138; 204/206

[56] References Cited

U.S. PATENT DOCUMENTS

| | | | |
|---|---|---|---|
| 1,058,048 | 4/1913 | Gibbs | 204/209 |
| 3,676,322 | 7/1972 | Kamata | 204/206 |
| 3,929,610 | 12/1975 | Wang | 204/208 |
| 4,053,377 | 10/1977 | Schlain et al. | 204/275 |
| 4,097,354 | 6/1978 | Ginatta | 204/275 |
| 4,155,816 | 5/1979 | Marencak | 204/231 |
| 4,196,059 | 4/1980 | Petrov | 204/261 |
| 4,395,320 | 7/1983 | Kasashima | 204/206 |

FOREIGN PATENT DOCUMENTS

| | | |
|---|---|---|
| 1172906 | 10/1968 | United Kingdom . |
| 1398742 | 9/1972 | United Kingdom . |

*Primary Examiner*—Kathryn Gorgos
*Attorney, Agent, or Firm*—Kenneth A. Koch; John J. Tomaszewski

[57] ABSTRACT

The invention relates to a method and apparatus for electrolytic refining of copper and the production of copper wires for electrical purposes on a continual basis which produces round copper wires directly from impure copper anodes and to treat such wires in order to impart the desired characteristics as electrical conductors. The apparatus handles copper anodes of customary size refining them at normal current densities of less than 55 amps/foot$^2$ onto starting wires of adequate tensile strength which is done continuously, the wire being provided to an electrolytic bath and, after withdrawal from the bath, the wires are finished by drawing and annealing.

5 Claims, 2 Drawing Sheets

METHOD AND APPARATUS FOR ELECTROLYTIC REFINING OF COPPER AND PRODUCTION OF COPPER WIRES FOR ELECTRICAL PURPOSES

Matter enclosed in heavy brackets [ ] appears in the original patent but forms no part of this reissue specification; matter printed in italics indicates the additions made by reissue.

This is a continuation-in-part of my earlier field patent application Ser. No. 007,764 filed Jan. 28, 1987 abandoned.

FIELD OF THE INVENTION

This invention is of a method and apparatus for use in the continuous production of round copper stock wire by refining impure copper anodes to produce wire for electrical purposes of a diameter of about 0.2 inch by electrodeposition.

BACKGROUND OF THE INVENTION

The present invention relates to the continuous production of round copper wires, destined for electrical purposes, manufactured during the electrolytic refining of copper. Particularly the invention refers to a method and an apparatus to improve the present art of electrolytic copper refining, the elimination of the normal posterior process of rod manufacturing, the further avoidance of about sixty percent of the previously required reduction in the size of the rods by cold drawing to finish wires of smaller diameters and the heat treatment of the copper wires to impart the characteristics of electrical conductors.

The prior art produce of electrolytic copper refining are pure copper plates commonly named "cathodes" which are about 3.3 ft (1000 mm) square and about ⅝ inch (15 mm) thick and are formed by electrodeposition of pure copper on starting sheets (thin leaves of refined copper). These leaves, also measuring about 3.3 ft square but about 0.04 inch (1 mm) thick, have to be intermittently introduced into the electrolytic tanks as the engrossed refined cathodic plates are removed as finished product, both operations using manual work. The electrolysis is carried out at low current densities (the amperage applied to the tanks spread over the immersed surfaces of the total number of the cathodic starting sheets present, or expressed in terms of the wetted areas of the crude copper anodes being refined) as otherwise the electricity required and thus the power cost, increases governed by Ohm's law directly proportional to the increase in current density. Under present economic factors current densities (cathodic or anodic) of (about 20 to 40 amp/ft$^2$ about 200 to 400 amp/m$^2$) are successfully used, resulting in a tankhouse consumption of about 230 kilowatt-hours of electricity per metric ton of cathodes produced and considering other accessory equipment, an overall refinery requirement of about 330 kw-hr per metric ton of copper is normal practice.

In order to use the prior art refined cathode plates to manufacture electric wires, such cathodes have to be melt, cast and hot rolled in a separate and complex facility in order to produce round rods; a process which additionally consumes about 350 kilowatt-hours of energy per metric ton of rod and involves considerable labor. Such rods are normally 5/16 inch (7.94 mm) in diameter. Furthermore, to convert these rods to round copper wires an additional facility is normally needed for cold drawing or "rod breakdown" as well as for annealing, consuming additionally about 70 kw-hr of power per metric ton of finished wire such as AWG 4 in size (5.189 mm diameter).

Thus, it is recited that the prior art of copper wire production destined for electrical purposes, starting with an electrolytic refining process, consumes a total of about 750 kw-hrs of energy per metric ton of produced wire 0.2043 inch (5.189 mm) in diameter.

U.S. Pat. No. 4,196,059 discloses a method and an apparatus for continuously introducing a thin copper wire as cathodic starting or base surface into a complicated tank for refining impure copper anode blocks thereby engrossing said wire by electrolytic deposition to a large diameter rod (about 20 mm) which constitutes its finished product. Excellent novelties are claimed to be able to operate at high current densities while preventing the contamination of the refined rod by the normal impurities found in the anode slime residues. But despite its merits for particular applications it is not suitable for production of electric wires directly by electrolysis because its large consumption of energy would defeat the purpose of improving the present art. Said apparatus consumes about 1200 kw-hrs of electricity per metric ton of produced rod as a result of the relatively large voltage necessary to operate at about 93 amp/ft$^2$ (1000 amps per square meter) plus the significant voltage drop in its baskets of high electrical resistance used to hold the anodes and in the necessary membranes barrying contaminants. Furthermore, the later processing (drawing and annealing) of a 20 mm copper rod to electric wire such as AWG 4 would require about 190 kw-hr of energy per metric ton, resulting in a total consumption of energy by said disclosure of about 1400 kw-hr/metric ton of wire, as compared to about 750 kw-hr per ton by actual conventional techniques.

Additionally the disclosure apparatus has inherent impediments to refine customary sized impure copper anodes at normal current densities. Firstly, said apparatus feeds each wire base or starting wire from an individual drum or reel and as 50 to 100 starting wires are necessary per anode row in order to obtain a large enough cathodic surface to spread the applied amperage over a sufficient area, the same large number of pay-off stations would be necessary but the physical dimensions of a tank prevent their appropriate location. Secondly, the struts used by said apparatus to support the starting wires in the tank and the wiper contacts to the negative terminal of the current supply require a substantial vertical dimension which impossibilitates placing the wires close enough to each other so as to achieve the proper cathodic surface area.

U.S. Pat. No. 4,395,320 also discloses an apparatus working on electroplating principles to engross wires but again its merits are in the opposite direction of the present invention. The apparatus thereby described consists of a cascade of electrolytic baths separated by rollers pressing on the wire being engrossed in order to smooth its rough surface consequent to the very high current densities objectively utilized. Such an apparatus, complicated with said rotatable rollers operating at current densities of about 280 amp/ft$^2$ (30 amp/dm$^2$) demands more than 2000 kw-hrs of electricity per metric ton of copper wire produced, also considering the energy lost by the high electrical resistivity of the anode baskets employed. Therefore its application to improve present copper refining by the elimination of the cumbersome normal flat starting sheets and attain the objective to avoid the customary rod making stage are precluded by its prohibitive energy consumption. Furthermore, the baskets used by said disclosure to hold the anodic crude copper, in relatively small granules, impossibilitates refining normal impure anodes measuring about 1000 mm square, 45 mm thick and weighing each about 350 kg. Additionally, the high rate ofelectrolytic circulation required by said apparatus to operate properly would considerably disturb the free settling of the anodic residue slimes to the bottom of the electrolytic tank and flowing proximate to the pure cathodic wire the impurities contained in such residues would codeposit, debasing the refined product.

Therefore, as U.S. Pat. Nos. 4,196,059 and 4,395,320 were envisioned for other particular purposes they are incapable to improve the current practice of electrical wire manufacturing. Such practice starting with electrolytic refining of copper that engrosses thin starting sheets to large "cathodes" which have to be melt, cast and rolled to rod and the rods further drawn down to wire sizes thus continues as the generalized art.

OBJECTS OF THE INVENTION

It is an object of the present invention to improve the electrolytic refining of copper by supplying continuously the cathodic base surface while operating at normal current densities.

It is a further object of the present invention to produce copper wire destined for electrical purposes avoiding the customary processing step of converting the refined cathodic copper plates into rod as well as avoiding most of the further breaking down of said rod to electrical wire size.

It is an additional object of the present invention to properly heat treat the electroformed copper wires in order to impart to them the adequate characteristics required as electrical conductors.

SUMMARY OF THE INVENTION

In one embodiment a rectangular electrolytic tank for copper refining about the size of prior art is fitted with a special superstructure of electrical conducting members in order to fix in position the customary sized anodes lengthwise, instead of across the tank, while maintaining contact with the positive terminal of the direct current supply source. Rows of anodes are thus disposed along the long axis of the tank, each row separated from each other substantially by the usual face to face (or anode center to center) distance. The resulting spaces or channels among the rows of said anodes, running uninterruptedly lengthwise the tank, are provided with the same number of "curtains" formed by horizontal copper wires which substitute the usual cathodic flat starting sheets.

Said curtains are formed by a single, pure copper wire of considerable tensile strength which is strung a plurality of times lengthwise through the tank and around electrical conducting shafts located externally the two end walls of the tank and thereby maintaining electrical continuity with the negative terminal of the power source. The shafts outside one of the end walls are motorized and the iddling shafts outside the opposite end wall are fitted with friction breaks, maintaining the wire under appropriate tension while the wire advances continuously in its designed path through the electrolytic bath, substantially in the mid center of the spaces among the anode rows. The wire which enters, exits and re-enters the tank through a plurality of vertically aligned ports on both end walls, in locations corresponding to the centerline of the space between adjacent rows of anodes, is guided by ceramic eyelets mounted on both end walls.

The starting or base wire is fed from a conventional pay-off device located in the lower deck of the refinery opposite the tank end with the drive shafts and the take-up, also of classical design, sits above the pay-off on the operating floor of the tank and receives the engrossed, electroformed wire. The starting wire entering the tank from the pay-off is electrically insulated from the corresponding electrical conducting guide shaft to inhibit initial electrolytic action thereby permitting the acid in the electrolyte to pickle residual oxides on the wire surface.

Mounted on the outside surface of each end wall of the tank and covering all the wire entrance and exit areas is a gasket with perforations corresponding to each port. A stainless steel plate covering the gasket, also with coinciding perforations, compresses the gasket against the exterior surface of such end wall by tightening nuts on bolts conveniently placed, thereby sealing all the clearances of the ports to keep the electrolyte contained in the tank and wiping off the wires from solution carry-over.

The finished electroformed wire, having been engrossed approximately 150% by weight as compared to the inlet wire, at average current densities not in excess of 55 amp/ft$^2$ (600 amp/m$^2$), is then further processed by conventional wet drawing and normal annealing which have been found to impart to the wire the internal crystalline structure and the smoothness of surface necessary to meet the specifications as electrical conductor.

The wire destined to the electrical market, about 60% by weight of the total output of the tank (but 100% based on the copper added by electrolysis) is given a light pass on a drawing machine and the balance of about 50% of said output, recycled as starting wire, is drawn to the correspondingly smaller, original, inlet wire size. At first glance this recycling might appear inefficient but actually adds only about 10% to the normal consumption of power of a conventional refinery.

BRIEF DESCRIPTION OF THE DRAWINGS

The subject matter which is regarded as the invention is particularly described hereinafter. The invention, however, together with further objects and advantages thereof, may best be understood by reference of the following description taken in conjunction with the accompanying drawings in which.

DETAILED DESCRIPTION

The present invention relates to a method and apparatus for the continuous production of copper wire by electrodeposition of copper onto a starting wire during the electrolytic refining of copper and the posterior treatment of such wires to convert them to electrical conductors.

Figure 1:
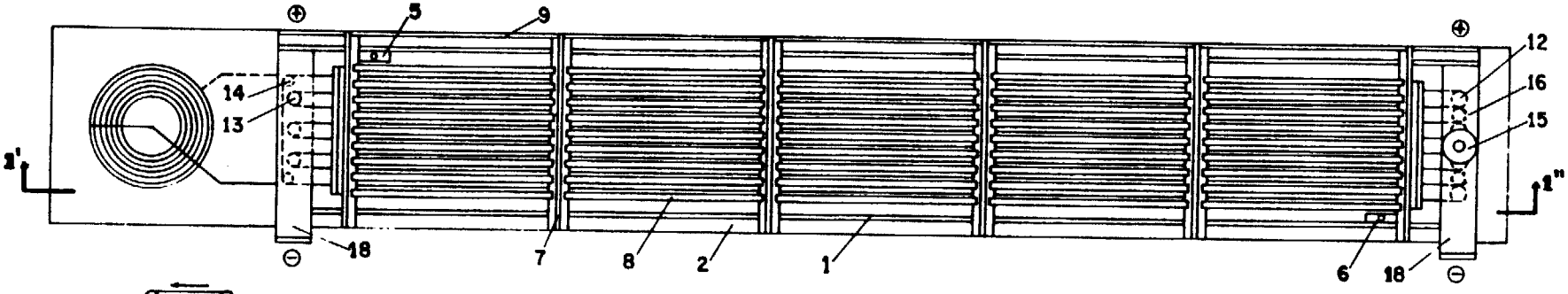
FIG. 1 illustrates the top view of one embodiment for the electrolytic refining of copper and the production of electrical wire in accordance with the principles of the present invention.
Figure 6:
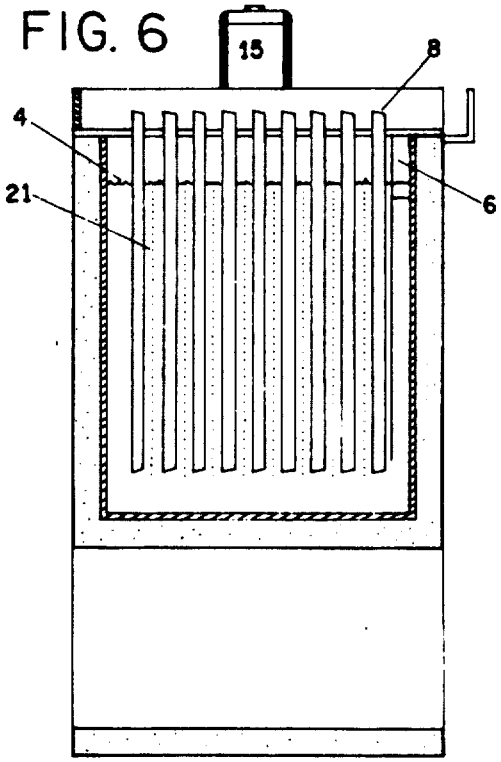

FIGS. 1 and 6 illustrate top, cross-sectional, ends and sectional views of one embodiment of the present invention. References are made herein to all of these figures concurrently. The embodiment shown in the six figures is only exemplary in nature, but the drawings and accompanying description completely illustrate the principles of the present invention. Similar numerals designate similar items in all figures.

Figure 2:
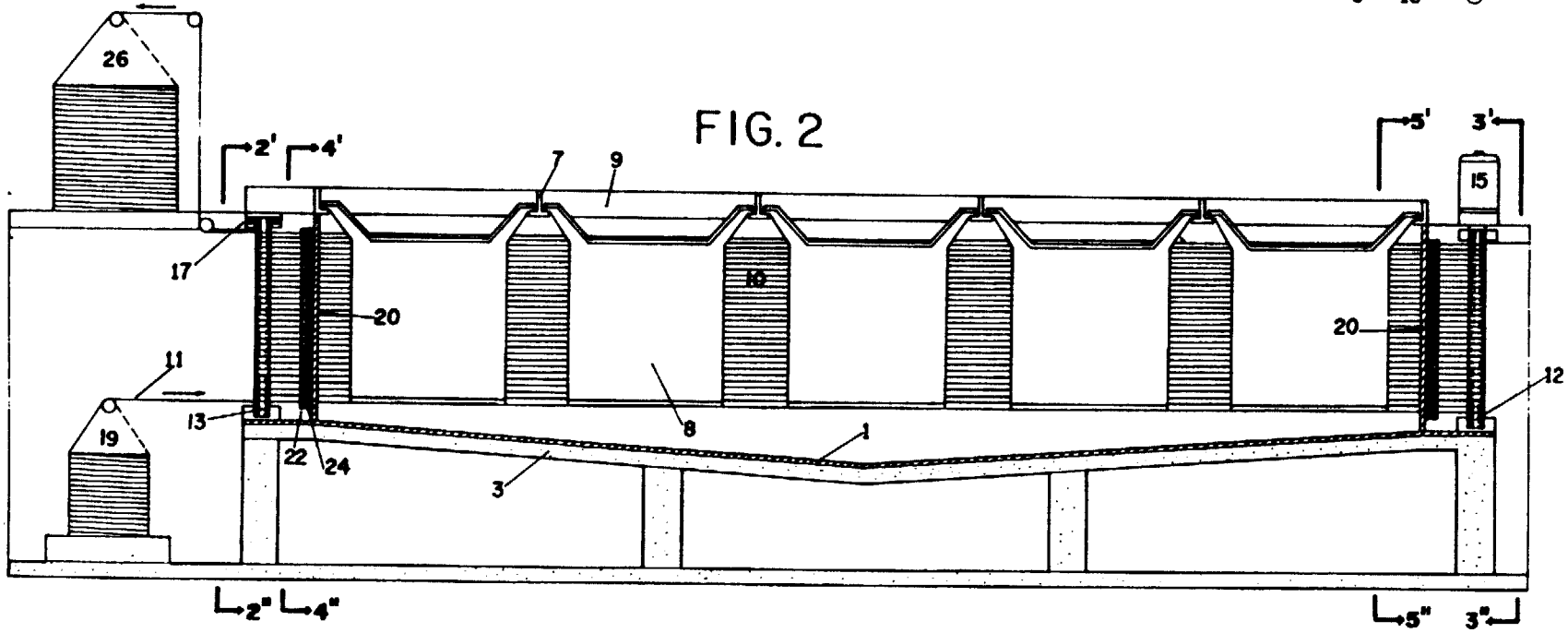
FIG. 2 illustrates a cross-sectional view of said apparatus, that view taken from the perspective of section 1'—1" in FIG. 1.
Figure 3:
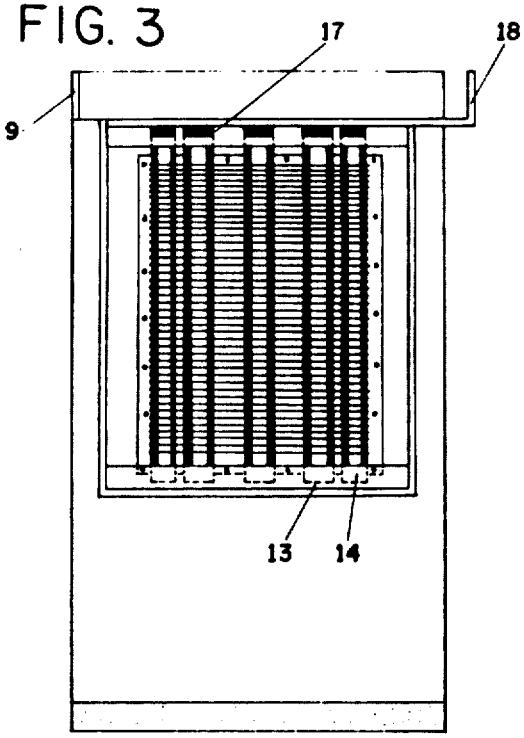
FIGS. 3 and 4 illustrate both end vies of said apparatus taken respectively form the perspectives of section lines 2'—2" and 3'—3" in FIG. 2.
Figure 4:
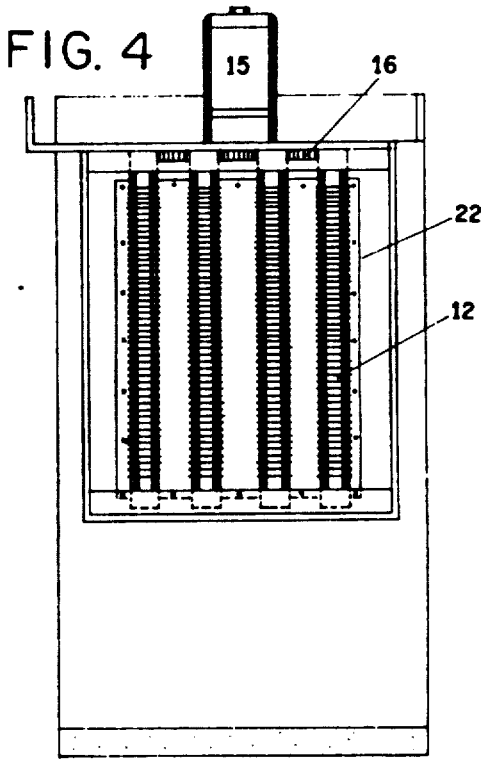

A rectangular tank made from PVC, polypropylene or suitable plastic plates 1, reinforced by concrete side walls 2 and bottom 3, holds the electrolytic bath 4. The electrolyte circulation boxes 5 and 6 handle the liquid from the tank respectively to and from the electrolyte purification section, not shown in the figures. Steel-reinforced copper structural members 7 fix in position into the tank the impure copper anodes 8 while maintaining contact through bus bar 9 with the positive terminal of the direct current supply, not shown in the figures. Groups of anodes in line (five are shown best in FIG. 2) are arranged in rows as appreciated in FIG. 1, forming amongst them uninterrupted channels below the electrolyte level (eight channels are shown best in FIG. 6).

Wire curtains 10, positioned in the center of the channels amongst the row of anodes are formed by a pure copper wire 11 strung a plurality of times through the tank and around electrical conducting driven shafts 12 and around iddle and deviation shafts 13 and 14 respectively, which are also electrical conductive. Motor 15 rotates all the driven shafts in synchronism by gears 16 and the iddle and deviation shafts have friction brakes 17 for tension control. Bus bars 18 connect the wire curtains through the conducting shaft with the negative terminal of the power source, not shown in the figures or to the next tank in the refinery.

Figure 5:
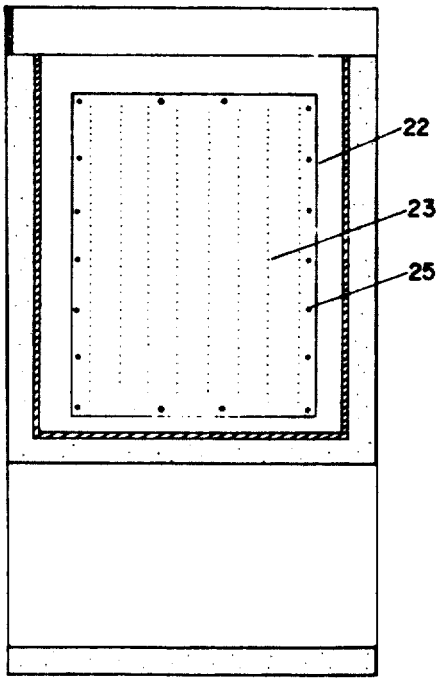
FIGS. 5 and 6 illustrate sectional views of the apparatus taken respectively along the lines 4'—4" and 5'—5" in FIG. 2.

The copper wire 11 acting cathodic as starting base wire is delivered from the pay-off 19 by the rotating shafts into and out of the tank through a plurality of vertically aligned ports 20 and is guided by ceramic eyelets 21 embedded in the plastic end plates of the tank as shown in FIG. 6. A stainless steel plate 22 as shown best in FIG. 5 with perforations 23 corresponding to the port holes in the tank wall compresses gasket 24 by means of tightening nuts 25.

The wire engrossed by the electrolytic action is wound in coils by the take-up 26. Not shown in the figures are the conventional cutting tools and welding machines used intermittently to remove the coils full with produce and to reload the exhausted pay-off with starting wire, both operations carried uninterruptedly without stopping the electrolysis.

The electric hoist used on the tank to replace the corroded anodes is neither shown in the figures nor the flow of residual anode mud to the purification section.

Intrinsic and part of the disclosure is also the posterior drawing and annealing of the electroformed wire to impart the adequate crystalline structure necessary to enable the final product to qualify as suitable for electrical purposes. Notwithstanding, as these final steps are carried in conventional drawing and annealing machines they are not illustrated in the figures.

EXAMPLE

Experiments carried on a pilot installation facility testing all stages of the disclosed method permit to calculate the following practical model of an apparatus constructed as described by the illustrations of FIGS. 1 to 6.

An electrolytic tank measuring 22 ft. long, 3 ft 6 inches wide and 4 ft. 6 inches deep is used to produce electrical wire while refining 45 impure copper anodes. The tank is filled with an electrolyte containing 48 gm/l of copper, 200 gm/l of sulfuric acid, 35 mg/l of hydrochloric acid and minor amounts of glue and thiourea. The electrolyte is circulated at a rate of 7 gallons per minute and maintained at a temperature of 56° celsius.

The anodes measuring each 3 ft. 2 inches wide, 3 ft. 3 inches high and 1-13/16 inches thick and individually weighing 830 lbs. are fixed in nine straight rows of five anodes each spaced 3-15/16 inches apart as measured from center to center of each row. A pure copper wire 0.1285 inches in diameter (AWG 8) is fed from a rotating coil and convoluted 67 times around driven, iddle and deviation shafts forming eight curtains inside the tank, each one 3 ft. 3 inches high and located mid center along the free spaces among the anode rows. The driven shafts are four in number and the iddle shafts are three, all with a diameter of 3-15/16 inches, the deviation shafts are two with a diameter of 3 inches each. All nine shafts are made from commercial bronze and rotated by a single motor imparting the wire a velocity of 10.23 feet per minute.

A direct electric current at 0.37 volts is applied causing 20,000 amperes to flow through the electrolytic circuit resulting in an average current density of 37 amps/ft$^2$. Upon reaching steady state conditions after 22 hours of continuous operation the wire being coiled in the rotating take-up is engrossed to a diameter of 0.207 inches and continues substantially at that size while the anodes are practically consumed after 26 days of production.

The electrolyte is purified as usual and the anode slimes are also treated according to customary practice consuming, together with other auxiliaries, about 100 kw-hrs of energy per metric ton of copper added to the starting wire.

The engrossed copper wire issuing continuously from the tank is removed from the coiler in batches of 2000 lbs. each which concurrent and uninterruptedly recharging the pay-off with a full coil of starting wire.

It can be calculated that the power consumption of the electrolytic tank, considering 90% conversion efficency of the electric current rectifier and 94% current efficiency of the process is 370 kw-hrs per metric ton of net wire produced (the weight of copper added by electrodeposition to the starting, base wire). The motors driving the shafts and the take-up consume an additional 50 kw-hr per metric ton of produce resulting in a total tankhouse requirement of 520 kw-hrs of energy per metric ton of refined copper in the form of wire.

In the pilot facility the coils with the 0.207 inch diameter wires were taken to a wet drawing and annealing machine and processed as follows:

61.5% of the total weight (the weight of the starting wire plus the weight of the plated copper) was conventionally drawn and annealed to 0.2043 inches diameter (AWG 4), and 38.5% of the total weight was also conventionally drawn and annealed to 0.1285 inches diameter (AWG 8).

The consumption of energy by these classical operations of drawing and annealing while recycling starting wire in the required proportion, expressed in terms of the electro-deposited copper were:

| | | |
|---|---|---|
| To produce finished AWG 4 wire | 35 | kw-hrs per metric ton of copper. |
| To produce finished AWG 8 wire | 25 | kw-hrs per metric ton of copper. |
| TOTAL | 60 | |

The annealed finished wires were inspectedand found free from surface inperfections and upon further testing resulted in:

| | | |
|---|---|---|
| Electrical resistivity (20° C.): | 10.29 | ohms. circular mil/feet. |
| Elongation | 30.7 | percent |
| Tensile strength | 36,900 | pounds per square inch. |

Thereby meeting the international specifications of copper wires for electrical purposes.

The advantage of the disclosure producing electrical wire from electrolytically refined copper anodes with a total consumption of energy of about 580 kw-hrs per metric ton of product as compared to prior art with 750 kw-hrs is of considerable economical significance in addition to savings in labor.

What is claimed is:

1. A method for the continuous production of round copper stock wire [by refining impure copper anodes to produce wire] for electrical purposes [of a diameter of about 0.2 inches] by electrodeposition comprising the steps of:

providing *in a single tank* a bath of electrolytic fluid with dissolved copper therein;

providing a plurality of anodes [made of impure copper] arranged *within said single tank* in spaced and parallel relation with respect to one another in said bath and defining spaced parallel pathways;

introducing a clean starting copper wire of a first diameter [of about 0.12 inch] into said bath at a first station and threading said wire through the bath and along each of the pathways in a serpentine path to successive stations with the wire traversing the pathways between each station *said stations being outside of said bath and said wire forming at least a pair of vertical wire curtains defined by horizontally disposed wires, each of said curtains in said pair travelling in opposite direction from the other curtain in said pair within said single tank;* continuously drawing said wire through said bath between the stations to a final station including the steps of withdrawing said wire from the bath after each pathway is traversed and reintroducing said wire a plurality of times into said bath, repeatedly passing said wire through said bath for travel along the pathways between successive stations, so that pure copper is electrodeposited on the wire on travel along each pathway between the stations; and simultaneously applying an electrical current to said starting wire and to said anodes [at a current density less than 55 amps/feet$^2$ of surface area of the wire] so that the wire, while in the bath, acts as a cathode and copper ions are progressively and uniformly electrodeposited on the wire, thereby progressively increasing the cross-sectional area thereof while maintaining the surface of the wire smooth at all times; and continuously withdrawing the enlarged smooth copper wire from said bath at said final station as it reaches the desired engrossed size [of about 0.2 inches].

2. The method as set forth in claim 1 wherein said engrossed copper wire is subsequently annealed and drawn to impart to said wire the particular characteristics for electrical purposes and for use as starting wire for electroforming processes.

3. An apparatus for refining impure copper anodes to produce copper wire for electrical purposes by electrodepositing copper onto a starting copper wire which is clean [and of a diameter of about 0.12 inches], said apparatus comprising:

means for holding an electrolytic bath *said means including a single rectangular tank having a pair of parallel side walls separated by a pair of spaced end walls transverse to the side walls and separated from each other by the longitudinal dimension of the tank,* said [bath] *tank* having a first array of a plurality of *vertically aligned* ports arranged in [rows and columns] *each of said end walls* and a second array of a plurality of *vertically aligned* ports arranged in [rows and columns] *each of said end walls,* each array being [longitudinally] spaced from one another *a predetermined distance* and defining a [pathway] *longitudinal channel* between [each of] the confronting ports in the arrays; *a plurality of vertically disposed electrical conducting shafts located externally of each of said end walls and adjacent said first and second array of ports, means for rotating said electrically conducting shafts, said longitudinal channel being defined by two vertical cathode curtains separated by said predetermined distance each curtain being formed by a large plurality of closely associated horizontal copper wires disposed uninterruptedly lengthwise the tank, said curtains formed by a single continuous copper wire which is strung a plurality of times lengthwise through the tank and around said electrical conducting shafts, said single continuous copper wire sequentially passing around a first electrically conducting shaft, entering the electrolytic bath through a vertically aligned port in said first array traversing said longitudinal dimension of the tank, leaving said tank through a vertically aligned port in said first array passing around a second electrically conducting shaft, and re-entering the bath through a vertically aligned port in said second array and so forth until said wire has vertically traversed the wire curtain;* a plurality of anodes *arranged in at least three rows each row parallel to the longitudinal axis of the tank, and* disposed in said bath [between the columns of ports] *on either side of each wire curtain at least one of said rows being disposed in said longitudinal channel;* means for continuously introducing and withdrawing and reintroducing said copper wire into said bath, through said ports, to constrain the wire to travel in a serpentine path of movement and to pass through the bath a plurality of times between said ports and along said [pathways] *longitudinal channel;* means for applying an electrical current [at a current density less than 55 amps/foot$^2$] between said anodes and said copper wire; and means for moving said copper wire through said bath and ports and withdrawing said copper wire from said bath on a substantially continuous basis such that copper ions are smoothly electrolytically deposited on said copper wire and the wire becomes enlarged to a smooth diameter [of about 0.2 inches].

4. The apparatus as set forth in claim 3 wherein said means for holding an electrolytic bath includes, at each port, sealing means lined with dielectric, abrasion resistant material for passage of said copper wire therethrough.

5. The apparatus as set forth in claim 3 wherein roller means are provided to pull the wire through the bath and the roller means have a center line and said center line is coplanar with an associated anode and the diameter of said roller mans is equal to the distance between the center lines of adjacent pathways and anodes.

* * * * *